United States Patent
Chapman et al.

(10) Patent No.: US 7,575,196 B2
(45) Date of Patent: Aug. 18, 2009

(54) ICE PROTECTION SYSTEM AND METHOD INCLUDING A PLURALITY OF SEGMENTED SUB-AREAS AND A CYCLIC DIVERTER VALVE

(75) Inventors: Gregory J. Chapman, Scottsdale, AZ (US); Robert J. Greco, Mesa, AZ (US); Philip S. Chow, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 217 days.

(21) Appl. No.: 11/641,430

(22) Filed: Dec. 19, 2006

(65) Prior Publication Data

US 2008/0142638 A1   Jun. 19, 2008

(51) Int. Cl.
*B64D 15/02* (2006.01)
*B64D 15/20* (2006.01)

(52) U.S. Cl. .............................. 244/134 B; 244/134 F; 137/625.15

(58) Field of Classification Search ............. 244/134 R, 244/134 B, 134 C, 134 F; 137/262, 561 A, 137/624.13, 624.14, 625.15, 625.13, 625.12
See application file for complete search history.

(56) References Cited

U.S. PATENT DOCUMENTS

| | | | |
|---|---|---|---|
| 1,716,276 A * | 6/1929 | Koch | 244/134 B |
| 2,187,506 A | 1/1940 | Van Daam | |
| 2,285,071 A | 6/1942 | Wolff | |
| 2,312,187 A | 2/1943 | Patterson | |
| 2,327,046 A * | 8/1943 | Hunter | 137/624.14 |
| 2,330,151 A | 9/1943 | Smith | |
| 2,422,746 A * | 6/1947 | Patterson | 244/134 C |
| 2,514,105 A | 7/1950 | Thomas | |
| 2,559,851 A | 7/1951 | Dean | |
| 2,630,965 A | 3/1953 | Greatrex et al. | |
| 2,747,365 A | 5/1956 | Rainbow | |
| 3,058,695 A | 10/1962 | Simonis | |
| 3,933,327 A * | 1/1976 | Cook et al. | 244/134 B |
| 4,482,114 A | 11/1984 | Gupta et al. | |
| 4,783,026 A | 11/1988 | Rumford | |
| 4,852,343 A | 8/1989 | Norris et al. | |
| 4,976,397 A | 12/1990 | Rudolph et al. | |

(Continued)

FOREIGN PATENT DOCUMENTS

EP     0376371 A2     7/1990

(Continued)

OTHER PUBLICATIONS

EP Search Report, 07123159.1 dated Mar. 25, 2008.

*Primary Examiner*—Michael R Mansen
*Assistant Examiner*—Stephen Brookman
(74) *Attorney, Agent, or Firm*—Ingrassia Fisher & Lorenz, P.C.

(57) ABSTRACT

An ice protection system and method of implementing ice protection for a vehicle includes a plurality of segmented sub-areas each including a leading edge surface subject to the formation of ice thereon. The system further includes a plurality of air ducts, each in fluid communication with at least one of the segmented sub-areas and a source of heated air. A cyclic diverter valve is configured to provide a cyclic flow of heated air via the plurality of air ducts to each of the plurality of segmented sub-areas to protect the leading edge surface from the formation of ice.

14 Claims, 3 Drawing Sheets

U.S. PATENT DOCUMENTS

| | | | |
|---|---|---|---|
| 5,114,100 A * | 5/1992 | Rudolph et al. | 244/134 C |
| 5,807,454 A * | 9/1998 | Kawabe et al. | 156/214 |
| 6,481,210 B1 | 11/2002 | Chapman | |
| 2005/0263646 A1 * | 12/2005 | Nichols | 244/134 F |

FOREIGN PATENT DOCUMENTS

| | | |
|---|---|---|
| EP | 0590553 A1 | 4/1994 |
| EP | 1715160 A1 | 3/2006 |

* cited by examiner

ICE PROTECTION SYSTEM AND METHOD INCLUDING A PLURALITY OF SEGMENTED SUB-AREAS AND A CYCLIC DIVERTER VALVE

TECHNICAL FIELD

The present invention relates to aircraft ice protection and, more particularly, to an ice protection system and method that includes a plurality of segmented sub-areas and a cyclic diverter valve.

BACKGROUND

When an aircraft is flown during certain atmospheric conditions, ice can form and potentially accumulate on one or more of its exterior surfaces. Such ice formation and accumulation can result from, for example, impingement of atmospheric water droplets. The formation and accumulation of ice can have certain adverse and/or deleterious effects on aircraft performance.

For example, following its formation on an exterior surface, ice can break loose and enter the aircraft engines, or collide with protruding surfaces such as antennas, wings, moveable control surfaces, or various structures on the ground. Ice accumulation on airfoil surfaces such as wings and empennages can also adversely affect airfoil aerodynamic performance. In addition, the weight of any accumulated ice may change the overall weight and/or center of gravity of the aircraft. Moreover, ice accumulation on moveable surfaces may interfere with the operation of the moveable surface. Consequently, many aircraft include an ice protection system that either prevents the formation of ice on aircraft surfaces or removes ice that forms on such surfaces.

An aircraft ice protection system is typically configured to implement one, or perhaps two, types of ice protection methods. The ice protection methods that may be implemented are generally categorized as either anti-ice methods or de-ice methods. Anti-icing methods typically prevent ice formation on aircraft surfaces altogether, whereas de-ice methods typically allow ice to form on aircraft surfaces and periodically removes the formed ice.

Generally, there are two known anti-ice methods that may be implemented by an aircraft ice protection system. These anti-ice methods include the fully-evaporative method and the wet running method. The fully-evaporative anti-ice method fully evaporates all impinging water by heating the aircraft structure to a relatively high temperature using thermal energy, typically either electrically or hot engine bleed air. With the wet running method, ice formation is prevented by heating, or applying freezing point depressants to, the areas where the water is impinging. The impinging water is not evaporated, but instead runs downstream of the impinging area.

As regards de-icing methods, there are generally three different types, thermal, chemical, and mechanical. The thermal de-ice method uses thermal energy to raise the temperature of the surface, either electrically or by hot engine bleed air. The chemical de-ice method is implemented by applying a chemical freezing point depressant to the ice through pores in the structure. The formed ice then turns to slush and is swept away by the airstream. The mechanical de-ice method is typically implemented by using one or more devices to deform the exterior surface of the structure to break up the ice and allow it to be swept away by the airstream.

Although the above-described anti-ice and de-ice methods are generally safe, reliable, and robust, each suffers certain drawbacks. For example, the fully-evaporative anti-ice method requires a significant amount of thermal energy to implement. While the running wet anti-ice method requires less thermal energy than the fully-evaporative method, the amount of energy may still be significant. As regards the de-ice methods, although each of the above-described de-ice methods may require less energy to implement than either of the two anti-ice methods, the use of only a de-ice method on an aircraft is typically not implemented. Rather, a de-ice method, if implemented, is typically done so in combination with either the fully-evaporative anti-ice method or the wet running anti-ice method. This is typically done because, for example, ice formation on the some of the aircraft surfaces may adversely impact flight performance, and ice that is removed from an engine nacelle may be ingested into the engine, which can have deleterious effects.

In view of the foregoing, it may be seen that currently known aircraft ice protection systems typically use a relatively significant amount of energy. Most common is the use of engine bleed air as the energy source. Hence, there is a need for an aircraft ice protection system and method that can implement an adequate level of ice protection for an aircraft yet operate using less energy than previous known systems. The present invention addresses at least this need.

BRIEF SUMMARY

The present invention provides an ice protection system for a vehicle. The ice protection system comprising a plurality of segmented sub-areas, each including a surface subject to the formation of ice, a flow of heated air, and a cyclic diverter valve configured to provide the flow of heated air to each of the plurality of segmented sub-areas in a cyclic manner.

In one embodiment, and by way of example only, an ice protection system is provided for an aircraft subject to the formation of ice thereon a leading edge and including a source of heated air. The ice protection system comprising a plurality of segmented sub-areas, each including a surface subject to the formation of ice thereon a leading edge, a plurality of air ducts, each in fluid communication with at least one of the segmented sub-areas and the source of heated air, and a continuously rotating diverter valve configured to provide a cyclic flow of the heated air via the plurality of air ducts to each of the plurality of segmented sub-areas.

In another exemplary embodiment, an ice protection system for an aircraft including an engine nacelle having leading edge subject to the formation of ice thereon is provided. The ice protection system comprising a plurality of segmented sub-areas defined in the engine nacelle, a plurality of air ducts, and a cyclic diverter valve. Each of the segmented sub-areas defined in the engine nacelle including a leading edge surface, a fluid inlet and at least one fluid outlet adjacent the leading edge surface. Each of the plurality of air ducts being in fluid communication with the fluid inlet of at least one of the segmented sub-areas and a source of heated air. The cyclic diverter valve configured to provide a cyclic flow of heated air via the plurality of air ducts to each of the plurality of segmented sub-areas.

In still another exemplary embodiment, an ice protection system is provided for an aircraft including a plurality of aircraft wings each having a leading edge subject to the formation of ice thereon. The ice protection system comprising a first segmented sub-area defined by a first aircraft wing and a second segmented sub-area defined by a second aircraft wing, a plurality of air ducts, and a cyclic diverter valve. Each of the segmented sub-areas including a leading edge surface, at least one fluid inlet and at least one fluid outlet adjacent the leading edge surface. Each of the plurality of air ducts in fluid communication with the fluid inlet of at least one of the segmented sub-areas and a source of heated air. The cyclic diverter valve configured to provide a cyclic flow of heated air via the plurality of air ducts to each of the plurality of segmented sub-areas.

In yet a further exemplary embodiment, a method of implementing ice protection for an aircraft is provided. The method comprising the steps of providing a plurality of segmented sub-areas, each including a leading edge surface subject to the formation of ice and operating a cyclic diverter valve configured to provide a cyclic flow of heated air to each of the plurality of segmented sub-areas.

Other independent features and advantages of the preferred ice protection system and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
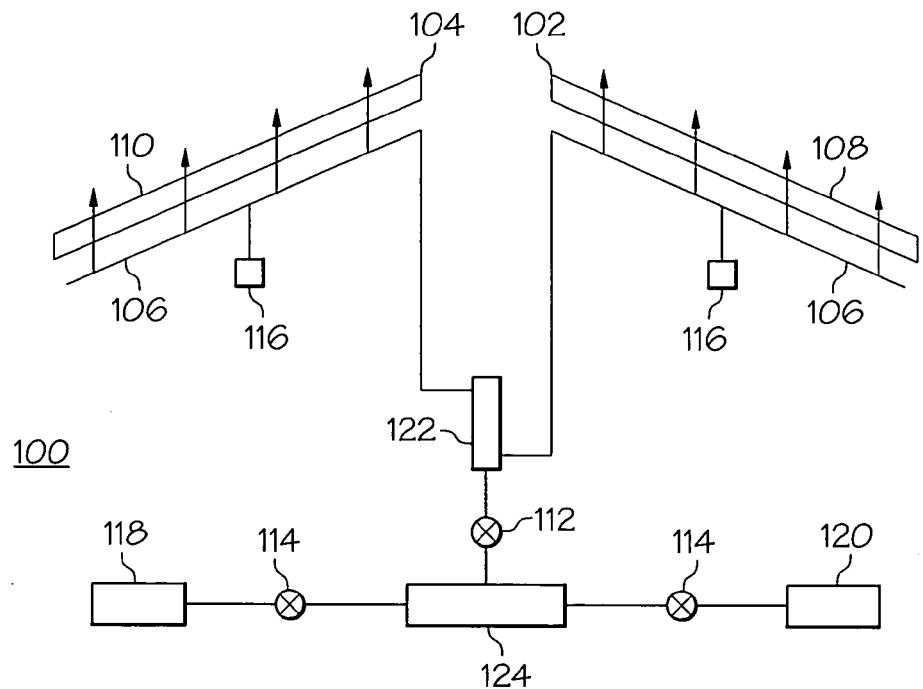
FIG. 1 is schematic diagram of an exemplary embodiment of a ice protection system for an aircraft according to the present invention.

Turning now to the description and with reference first to FIG. 1, illustrated schematically is an exemplary embodiment of an ice protection system 100 for a two-engine aircraft. The system 100 utilizes continuous flow of bleed air from the aircraft to anti-ice a right hand aircraft wing 102, or a first segmented sub-area, and a left hand aircraft wing 104, or a second segmented sub-area. The system 100 preferably includes the following features for each of the wings 102 and 104: a conduit or duct, such as a piccolo tube 106, to direct a flow of bleed air to a leading edge 108 of the right hand wing 102 and a leading edge 110 of the left hand wing 104, a pressure regulating valve 112 to control the flow of bleed air, and a plurality of shut-off valves 114 to enable and disable the system 100. The shut-off valves 114 may optionally include a check valve when indicated. In addition, the system 100 may optionally include a plurality of temperature feedback controls 116, each coupled to a wing leading edge 108 and 110. In the system 100, a left hand engine 118 will supply the anti-ice flow of bleed air to the left hand wing 104 and a right hand engine 120 will supply the anti-ice flow of bleed air to the right hand wing 102. The system 100 further includes a means for continuously toggling the flow of bleed air back and forth between the right hand aircraft wing 102 and the left hand aircraft wing 104 such as a cyclic diverter valve 122. In a preferred embodiment cyclic diverter valve 122 is fabricated as a continuously rotating diverter valve (CRDV) described herein. The cycling of the flow of bleed air enables a reduction in the time averaged bleed needs for the ice protection system 100. For conventional anti-ice systems using bleed air to provide ice protection, often the system is sized by condition of providing the bleed from one engine; as a result the plumbing pressure losses are greatest. When the bleed is provided by both engines the system has lower pressure loss and will draw more bleed from the engines. In this particular embodiment, the ability to cycle the bleed air flow from the left hand wing 104 to the right hand wing 102, and vice versa, has a similar result as when the bleed air is provided from one engine, leading to a lower bleed air flow.

When the anti-ice system 100 is first activated much of the bleed energy is used to raise the temperature of supporting/structure components of the wing leading edges 108 and 110, such as the ribs and ducting (not shown). After the structure is warmed it does not need as much energy to sustain its temperature so less bleed air flow is required for continuous operation. Since the structure has thermal mass, if the bleed air flow is reduced, the structure will slowly cool, supplementing the heat needed for the anti-ice function; if the bleed air flow is then increased the structure will be raised in temperature again. This cycle of cooling and heating can be repeated over and over again. A bleed air temperature that is well above the critical temperature needed for anti-icing is fundamental to this process. For example, water boils and evaporates at 100° C. so a bleed temperature of 200° C. would be well above the boiling temperature.

During operation, bleed flow from the right hand engine 120 and/or the left hand engine 118 is supplied to a manifold 124. It should be understood that the specific type of valve, and number of valves, located between the right hand engine 120 and the left hand engine 118 and the manifold 124 will vary depending upon the specific aircraft needs and engine characteristics. Bleed air flow valve 112 and is controlled by the temperature controls 116 coupled to the wing leading edges 108 and 110. It is anticipated that in alternate embodiments of the bleed system, the pressure regulating valve 112, the shut-off valves 114 and the temperature feedback controls 116 do not need to reside in separate valve structures, but are illustrated as such in FIG. 1 for simplicity.

The cyclic diverter valve 122, or CRDV, shown in FIG. 1 cycles the bleed air flow from the right hand wing 102 to the left hand wing 104, and thus delivers a cyclic flow of heated air between the segmented sub-areas. The piccolo tubes 106 direct the flow of bleed air to the leading edges 108 and 110 surfaces to be de-iced. The piccolo tubes 106 include a plurality of orifices (not shown) that are sized to meter the necessary flow of bleed air.

Figure 2:
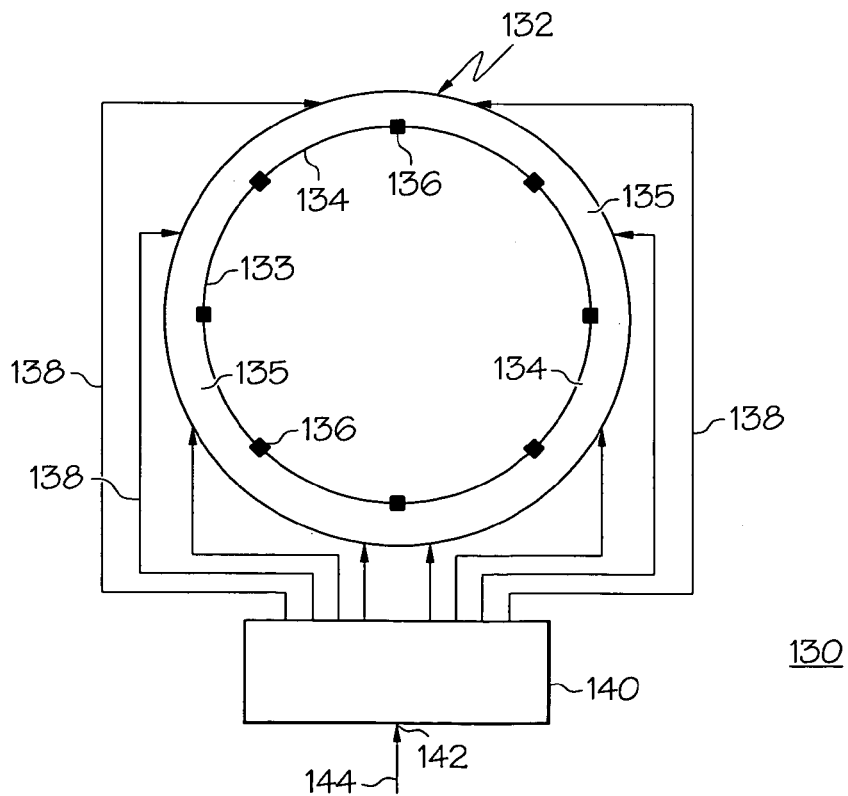
FIG. 2 is a schematic diagram of another exemplary embodiment of an ice protection system for an aircraft according to the present invention.

Referring now to FIG. 2, illustrated is an alternate embodiment of a cyclic thermal ice protection system, generally referenced 130. Similar to the first system embodiment illustrated in FIG. 1, the ice protection system 130 uses engine bleed air or engine exhaust air to provide inlet ice protection for the engine installation. Illustrated in FIG. 2, is a schematic end view of an aircraft engine nacelle 132 including an outer skin 133 on which ice may form and/or accumulate. The aircraft nacelle 132 has defined a plurality of segmented sub-areas 134 each defined by a cavity 135 bounded by the outer skin 133 and an ice protection air exit opening 136 in a surface of the nacelle structure. Each sub-area 134 is in fluidic communication via a fluid conduit or duct 138, extending between the air exit openings 136, a cyclic diverter valve 140, such as a pneumatic continuously rotating diverter valve, and a source of heated air 144.

The system 130 provides ice protection for the engine nacelle 132 by cyclically heating the surface of each of the segmented sub-areas 134 via air exit opening 136. More specifically, the system 130 further includes an air inlet 142 to receive the heated air 144. Typically, bleed air flow or air heated by an engine compressor provides the required heat source rather than electrical energy to generate the heated air 144. This ability to utilize air system air rather than electrically heated air takes advantage of the long life and low maintenance requirements of air systems. During operation, the heated air 144 is directed to each of the segmented sub-areas 134 via the fluid conduits 138 and the openings 136. This heating of the segmented sub-areas 134 allows for limited ice build up, that can be swept away in an airstream. The heated air is applied to the local areas, or more specifically the segmented sub-areas 134, of the overall nacelle surface to be protected against ice, thereby minimizing the total amount of energy required. The cyclic control valve 140 directs the heated air 144 to each local sub-area 134 as a function of the amount of heat and time required for that local sub-area 134. An optional secondary jet of heated air (not shown) may be used to help fracture the ice that is swept away in the airstream. The optional secondary jet can also be used to help control the size of shed ice particles. This approach combines the ice protection advantage of an anti-ice system with the low energy requirements of a de-ice system.

The ice protection system 130 remains operational at all times because of its low energy requirement and system reliability. The ability to remain on at all times prevents inlet ice build up in an inadvertent ice encounter. Furthermore, there is no need for control by the pilot. Although a specific aircraft engine nacelle is illustrated, the ice protection system 130 may be applicable to all types of engine or power plant installations that are susceptible to inlet ice.

Figure 3:
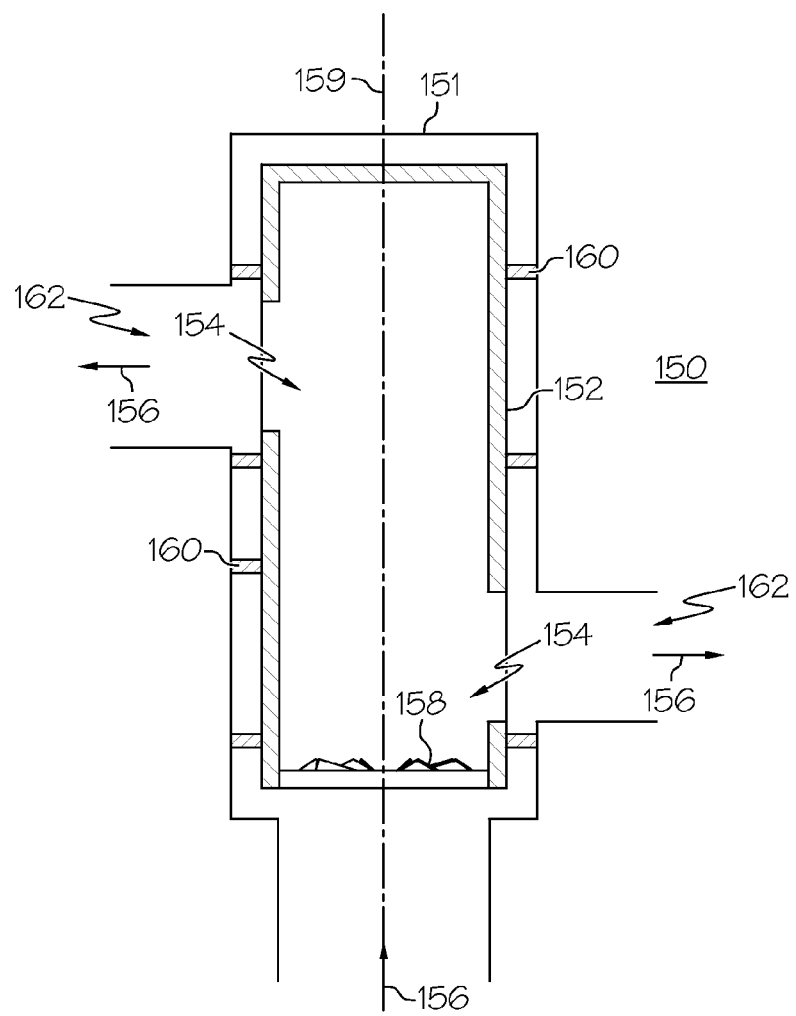
FIG. 3 is a simplified cross section view of a cyclic diverter valve for use in the ice protection system according to the present invention.
Figure 4:
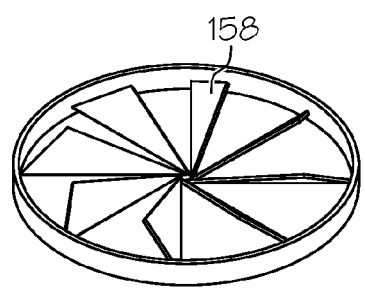
FIG. 4 is a simplified end view of a portion of the cyclic diverter valve of FIG. 3.

Referring now to FIGS. 3 and 4, illustrated is a side sectional view and end view, respectively, of a continuously rotating diverter valve 150, generally similar to the cyclic diverter valve 122 of FIG. 1 and the cyclic diverter valve 140 of FIG. 2. Continuously rotating diverter valve 150 comprises a valve body 151 having housed therein a rotating barrel 152 with a plurality of cut-outs or openings 154, of which only one is illustrated in FIG. 3. The plurality of cut-outs or openings 154 direct a flow of bleed air 156 from within the valve body 151, through a plurality of valve outlets 162 that lead to a plurality of segmented sub-areas, such as the wings 102 and 104 of FIG. 1, or the sub-areas 134 of FIG. 2.

In a preferred embodiment, the rotating barrel 152 contains a plurality of turbine vanes 158, as best illustrated in FIG. 4. As the flow of bleed air 156 moves through the plurality of turbine vanes 158 the motion causes the barrel 152 to rotate about axis 159. This rotation of the barrel 152 provides the cyclic flow of bleed air 156 via the openings 154. The plurality of turbine vanes 158 can be designed to give a particular rotation rate dependent upon design specifications. In an alternate embodiment, a shaft could be attached to the barrel and a drive motor could be substituted for the plurality of turbine vanes 158 if some other form of speed control was desired. A plurality of seals and bearings 160 are located as needed to support the rotating barrel 152 within the valve body 151 and control leakage and thrust loads. The desired rotation rate of the barrel 152 will depend upon the transient heat transfer characteristics of the ice protection system.

Figure 5:
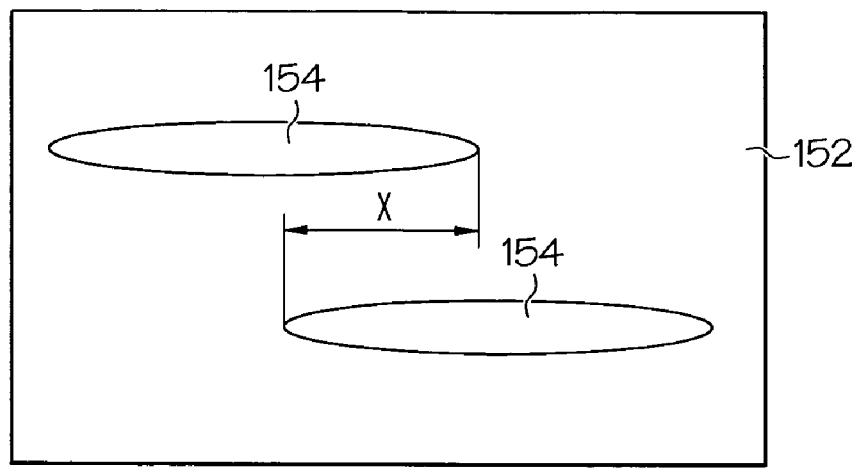
FIG. 5 is a simplified flattened view of a portion of the cyclic diverter valve of FIG. 3.

FIG. 5 illustrates a portion of the cyclic diverter valve 150 of FIG. 3. More particularly, FIG. 5 illustrates the cut-outs or openings 154 in the barrel 152 by showing an unwrapped barrel 152. The cut-outs or openings 154 are sized to provide a gradual increase and decrease in flow of the bleed air at the valve outlets 162 (FIG. 3). The cut-outs or openings 154 for the plurality of fluid outlets 162 are designed to have an overlap area, generally referenced "x", that is sufficient to prevent a complete shut-off of the flow of bleed air from the ice protection system. More specifically, the overlap area "x" ensures that a flow of bleed air 156 (FIG. 3) is being delivered to a portion of the segmented sub-areas of the ice protection system at all times.

In a preferred embodiment, to assure proper operation of the continuously rotating diverter valve 150, a temperature sensing control, similar to the temperature feedback controls 116 (FIG. 1), in communication with each of the plurality of segmented sub-areas, is configured to generate a signal proportional to the magnitude of the condition at a surface of each of the leading edges of the segmented sub-areas. More specifically, if the continuously rotating diverter valve barrel 152 becomes stuck in a position that provides the majority of the flow of bleed air to one sub-area of the system then a low temperature would be sensed at the other sub-areas indicating a problem. If the valve barrel 152 sticks in a position where it provides a reduced flow of equal proportions to a plurality of sub-areas then a low temperature would be sensed on at both locations. During proper operation, the continuously rotating diverter valve 150 provides a continuous bleed air flow to the ice protection system in a cyclical manner. In an alternative embodiment, for redundancy purposes a second continuously rotating diverter valve (not shown) could be plumbed into the ice protection system.

Figure 6:
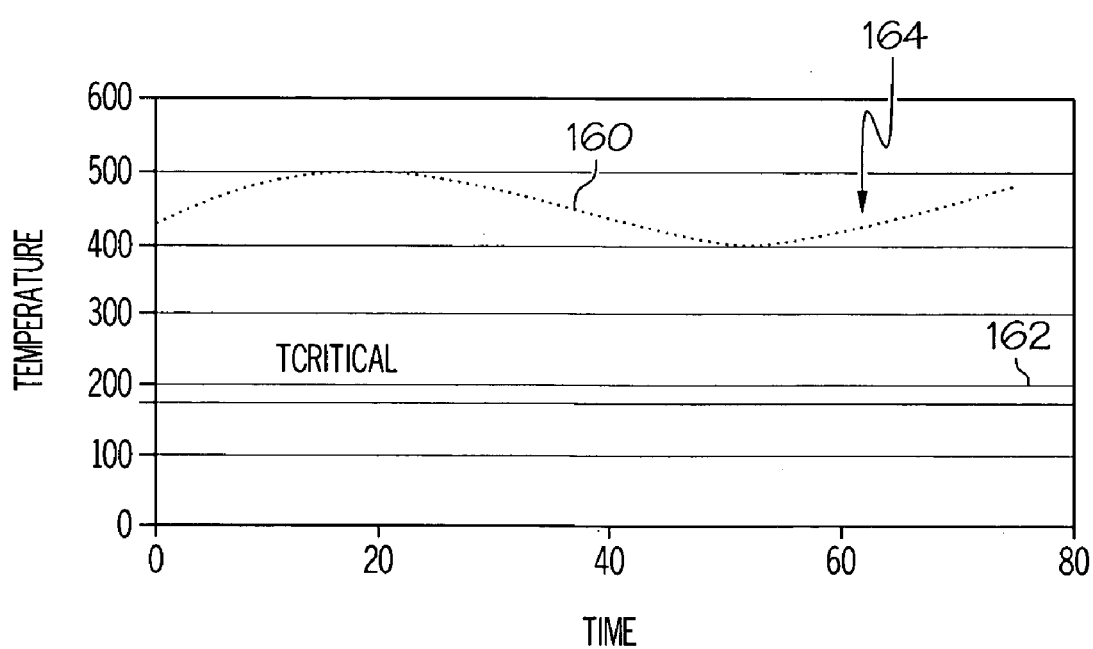
FIG. 6 is a graphical illustration of the cyclical operation of the cyclic diverter valve of FIG. 3.

Referring now to FIG. 6, after the ice protection system and an associated leading edge heat up, the system will have a certain temperature decay rate 160 and the bleed flow 156 (FIG. 3) will be reduced and/or removed. With respect to the ice protection system 100 of FIG. 1, as long as the temperature of the wing leading edge 108 and 110 remains above a predetermined critical temperature 162 for ice accumulation the flow of bleed air 156 (FIG. 3) can be reduced then increased again via the cyclic diverter valve 122 creating a cycle 164 as best illustrated in FIG. 6.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An ice protection system for an aircraft comprising:
a plurality of aircraft components, each including a surface subject to the formation of ice;
a flow of heated air; and
a continuously rotating diverter valve configured to provide the flow of heated air to the plurality of aircraft components in a continuous cyclic manner, the continuously rotating diverter valve including a plurality of turbine blades affixed to a barrel, wherein passage of the flow of heated air through the plurality of turbine blades and into the barrel results in rotation of the barrel, the barrel including a plurality of openings formed therein and configured for the passage of the flow of heated air therethrough, wherein at least a portion of each opening is formed in a spaced apart overlapping manner relative to another opening, the continuously rotating diverter valve positioned within a housing having an inlet and at least one outlet.

2. An ice protection system as claimed in claim 1, wherein the plurality of aircraft components includes an engine nacelle divided into a plurality of segmented sub-areas, each of the plurality of segmented sub-areas defined by an outer skin, and a plurality of spaced apart ice protection air exit openings formed in a surface of the engine nacelle.

3. An ice protection system as claimed in claim 1, wherein the plurality of aircraft components includes a first aircraft component and a second aircraft component.

4. An ice protection system as claimed in claim 3, wherein the first aircraft component is a right hand wing and the second aircraft component is a left hand wing.

5. An ice protection system as claimed in claim 4, further including a plurality of conduits for delivering the flow of heated air to the right hand wing and the left hand wing.

6. An ice protection system as claimed in claim 1, wherein the flow of heated air is a flow of engine bleed air.

7. An ice protection system for an aircraft subject to the formation of ice thereon and including a source of heated air, comprising:
 a plurality of aircraft components, each including a surface subject to the formation of ice thereon a leading edge;
 a plurality of air ducts, each in fluid communication with at least a portion of each of the plurality of aircraft components and the source of heated air; and
 a continuously rotating diverter valve configured to provide a cyclic flow of the heated air via the plurality of air ducts to each of the plurality of aircraft components, the continuously rotating diverter valve including a plurality of turbine blades affixed to a barrel, wherein passage of the flow of heated air through the plurality of turbine blades and into the barrel results in rotation of the barrel, the barrel including a plurality of openings formed therein and configured for the passage of the flow of heated air therethrough, wherein at least a portion of each opening is formed in a spaced apart overlapping manner relative to another opening, the continuously rotating diverter valve positioned within a housing having an inlet and at least one outlet.

8. An ice protection system as claimed in claim 7, further including a temperature sensing control in communication with each of the plurality of aircraft components and generating a signal proportional to an icing condition at a surface of the leading edges of each of the plurality of aircraft components.

9. An ice protection system as claimed in claim 7, wherein the plurality of aircraft components includes an engine nacelle divided into a plurality of segmented sub-areas, each of the plurality of segmented sub-areas defined by an outer skin, and a plurality of spaced apart ice protection air exit openings formed in a surface of the engine nacelle.

10. An ice protection system as claimed in claim 7, wherein the plurality of aircraft components includes a first aircraft component corresponding to an aircraft wing structure and a second aircraft component corresponding to an aircraft wing structure.

11. An ice protection system as claimed in claim 7, wherein the heated air is engine bleed air flow.

12. An ice protection system for an aircraft including an engine nacelle having a leading edge subject to the formation of ice thereon, the ice protection system comprising:
 a plurality of segmented sub-areas defined in the engine nacelle, each of the plurality of segmented sub-areas defined by an outer skin, and a plurality of spaced apart ice protection air exit openings formed in a surface of the engine nacelle, each of the plurality of segmented sub-areas including a leading edge surface, a fluid inlet and at least one fluid outlet adjacent the leading edge surface;
 a plurality of air ducts, each in fluid communication with the fluid inlet of at least one of the segmented sub-areas and a source of heated air; and
 a continuously rotating diverter valve configured to provide a cyclic flow of heated air via the plurality of air ducts to each of the plurality of segmented sub-areas, the continuously rotating diverter valve including a plurality of turbine blades affixed to a barrel, wherein passage of the flow of heated air through the plurality of turbine blades and into the barrel results in rotation of the barrel, the barrel including a plurality of openings formed therein and configured for the passage of the flow of heated air therethrough, wherein at least a portion of each opening is formed in a spaced apart overlapping manner relative to another opening, the continuously rotating diverter valve positioned within a housing having an inlet and at least one outlet.

13. An ice protection system for an aircraft including a plurality of aircraft wings each having a leading edge subject to the formation of ice thereon, the ice protection system comprising:
 a first segmented sub-area defined by a first aircraft wing and a second segmented sub-area defined by a second aircraft wing, each segmented sub-area including a leading edge surface;
 a plurality of air ducts, each in fluid communication with at least one of the segmented sub-areas and a source of heated air; and
 a continuously rotating diverter valve configured to provide a cyclic flow of heated air via the plurality of air ducts to each of the plurality of segmented sub-areas, the continuously rotating diverter valve including a plurality of turbine blades affixed to a barrel, wherein passage of the flow of heated air through the plurality of turbine blades and into the barrel results in rotation of the barrel, the barrel including a plurality of openings formed therein and configured for the passage of the flow of heated air therethrough, wherein at least a portion of each opening is formed in a spaced apart overlapping manner relative to another opening, the continuously rotating diverter valve positioned within a housing having an inlet and at least one outlet.

14. A method of implementing ice protection for an aircraft, the method comprising the steps of:
 providing a plurality of aircraft components, each including a leading edge surface subject to the formation of ice; and
 operating a continuously rotating diverter valve configured to provide a cyclic flow of heated air to the leading edge surface of each of the plurality of aircraft components, the continuously rotating diverter valve including a plurality of turbine blades affixed to a barrel, wherein passage of the flow of heated air through the plurality of turbine blades and into the barrel results in rotation of the barrel, the barrel including a plurality of openings formed therein and configured for the passage of the flow of heated air therethrough, wherein at least a portion of each opening is formed in a spaced apart overlapping manner relative to another opening, the continuously rotating diverter valve positioned within a housing having an inlet and at least one outlet.

* * * * *